(12) United States Patent
Huang et al.

(10) Patent No.: US 8,400,937 B2
(45) Date of Patent: Mar. 19, 2013

(54) RESOURCE METRIC QUANTIZATION IN WIRELESS DATA COMMUNICATIONS

(75) Inventors: Qiuping Huang, Shuiguanxincun (CN); Yuan Zhu, Yuan Jia Yuan (CN); Kuilin Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 535 days.

(21) Appl. No.: 12/646,727

(22) Filed: Dec. 23, 2009

(65) Prior Publication Data

US 2011/0044183 A1 Feb. 24, 2011

Related U.S. Application Data

(60) Provisional application No. 61/275,266, filed on Aug. 24, 2009.

(51) Int. Cl.
*H04J 1/16* (2006.01)
(52) U.S. Cl. .................................................. 370/252
(58) Field of Classification Search .................. 370/229, 370/230, 252, 208, 254, 310, 311, 320, 329, 370/341, 328, 335, 342, 260, 442, 437; 455/452.1, 455/447, 410, 450, 451, 452, 453, 454, 427, 455/442, 348, 436; 375/220, 260, 346
See application file for complete search history.

(56) References Cited

U.S. PATENT DOCUMENTS

| | | | | |
|---|---|---|---|---|
| 2004/0013191 A1* | 1/2004 | Chen et al. | | 375/233 |
| 2006/0014542 A1* | 1/2006 | Khandekar et al. | | 455/447 |
| 2007/0064780 A1* | 3/2007 | Zheng et al. | | 375/220 |
| 2007/0177501 A1* | 8/2007 | Papasakellariou | | 370/229 |
| 2008/0232320 A1* | 9/2008 | Lee et al. | | 370/329 |
| 2009/0092059 A1* | 4/2009 | Fu | | 370/252 |
| 2009/0092086 A1* | 4/2009 | Lee et al. | | 370/329 |
| 2009/0098899 A1* | 4/2009 | Gorokhov et al. | | 455/522 |
| 2009/0201867 A1 | 8/2009 | Teo et al. | | |
| 2009/0247148 A1* | 10/2009 | Chen et al. | | 455/422.1 |
| 2009/0253381 A1* | 10/2009 | Zhang et al. | | 455/69 |
| 2009/0279442 A1* | 11/2009 | Rave | | 370/246 |
| 2010/0197314 A1* | 8/2010 | Maaref et al. | | 455/450 |
| 2010/0254335 A1* | 10/2010 | Koo et al. | | 370/329 |
| 2010/0311349 A1* | 12/2010 | Koo et al. | | 455/67.11 |
| 2011/0009142 A1* | 1/2011 | Higuchi | | 455/509 |
| 2011/0070911 A1* | 3/2011 | Zhang et al. | | 455/509 |
| 2011/0134759 A1* | 6/2011 | Kim et al. | | 370/242 |
| 2011/0194423 A1* | 8/2011 | Cho et al. | | 370/252 |

OTHER PUBLICATIONS

Clark Chen and Jeongho Park, Interference Mitigation DG Harmonized Text Proposal, IEEE 802.16 Broadband Wireless Access Working Group, Jul. 15, 2009, pp. 1-22.*
Intel Corporation, "Interference Mitigation DG Harmonized Text Proposal", IEEE 802.16 Broadband Wireless Access Working Group, C802.16m-09/1540r9, Jul. 15, 2009.
Intel Corporation, "Proposed Changes/Refinements to Section 18 (Support for Interference Mitigation) of IEEE 802.16m SDD (802.16m-09/0034)", IEEE 802.16 Broadband Wireless.

(Continued)

*Primary Examiner* — Abdullah Riyami
(74) *Attorney, Agent, or Firm* — Blakely, Sokoloff, Taylor & Zafman LLP

(57) ABSTRACT

A resource metric quantization is described that has use for resources of wireless data communications system. In one example the quantization include measuring a signal parameter for a plurality of frequency partitions, setting a first resource metric for a first frequency partition equal to a first value, determining a second and a third resource metric for a second and third frequency partition, respectively, based on comparing the measured signal parameter for the second and third frequency partitions to the measured signal parameter for the first partition, encoding a second and a third resource metric, and transmitting the encoded resource metrics to a remote wireless station.

16 Claims, 3 Drawing Sheets

OTHER PUBLICATIONS

PCT Search Report, PCT/US2010/046291, mailing date Apr. 27, 2011, Applicant Intel Corporation.

* cited by examiner

RESOURCE METRIC QUANTIZATION IN WIRELESS DATA COMMUNICATIONS

CROSS-REFERENCE TO RELATED APPLICATIONS

This application claims the priority of provisional application Ser. No. 61/275,266, filed Aug. 24, 2009, entitled Advanced Wireless Broadband Communication Systems and Methods.

FIELD

The present description relates to communicating parameters of radio signal channels in a wireless cellular radio communications system, and in particular, to quantizing a resource metric that is used for fractional frequency partition selection.

BACKGROUND

A cellular communications system typically has base stations (BSs) distributed throughout an area to provide data connectivity with mobile stations (MSs) throughout the area. The cellular system allows wireless communications to use less power and it allows frequencies to be reused by different subscribers connected to different base stations. Each base station connects through a communications infrastructure to a communications backbone to connect to other subscribers and to users and systems outside the cellular system. Because frequencies and channels are reused by different BSs, when a MS is near the edge of a cell, signals for other MSs in other cells can interfere with the MS's signal.

In mobile broadband radio systems such as IEEE 802.16m or 3GPP LTE (Third Generation Partnership Project Long Term Evolution) systems, Fractional Frequency Reuse (FFR) is used to mitigate the interference levels that users on the edge of a cell receive from users in other nearby cells. FFR effectively alleviates the interference levels on some subcarriers by setting these subcarriers' transmitting power among neighbor BSs in a certain pattern. A framework that allows the adaptation of an FFR configuration to achieve an optimal system level power loading, spectrum partition and resource allocation is referred to as Adaptive Fractional Frequency Reuse (AFR). Unlike traditional FFR which allocates an MS to a specific frequency partition according to the MS's geometry semi-statically, AFR also takes into account the short term fading of different frequency partitions to achieve even better system performance.

To support AFR, the BS needs to broadcast a resource metric for each frequency partition that it serves once in every broadcast period or once in some number of superframes. Each resource metric is 16 bits plus an identification of the particular frequency. This information is used by the MS to choose a frequency partition for its own use. After receiving the frequency partition, data, the MS sends a message to the BS to inform it as to which frequency partition it has selected. The signaling required to support AFR adds significant additional data to the broadcast signaling. In addition, the MS can report interference statistics that is measures for each partition back to the base station. With many MSs all reporting statistics back to the BS, significant signaling resources can also be required.

BRIEF DESCRIPTION OF THE DRAWINGS

Embodiments of the present invention are illustrated by way of example, and not limitation, in the figures of the accompanying drawings in which like reference numbers are used to refer to like features, and in which.

DETAILED DESCRIPTION

Figure 1:
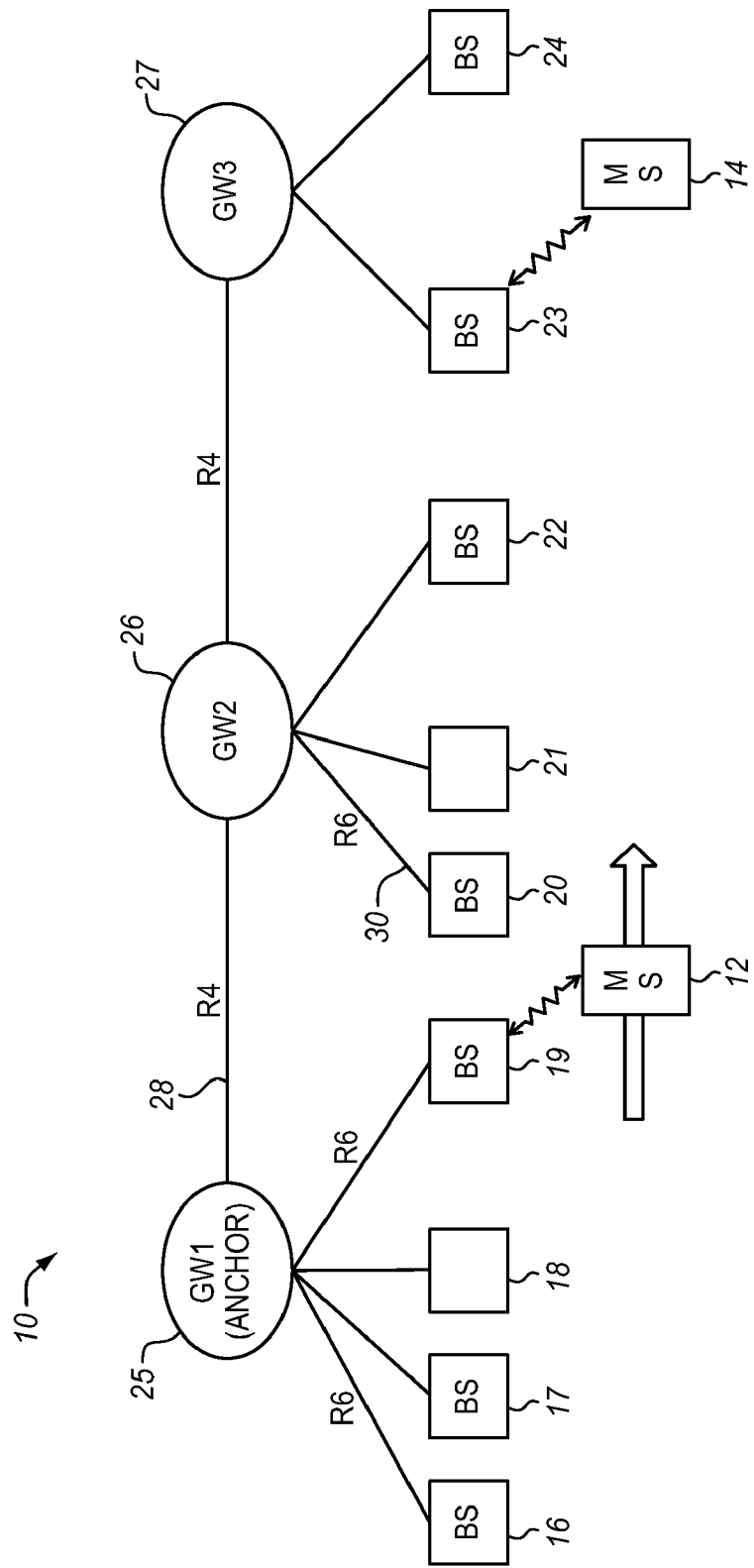
FIG. 1 is a diagram of a wireless radio system suitable for implementation of an embodiment of the present invention.

Fractional Frequency Reuse (FFR) techniques allow different frequency reuse factors to be applied over different frequency partitions. Typically each base station will have four frequency partitions. However, the number can vary, depending on the circumstances. Each partition can have different transmit power levels within the same cell. The specific power level for any one frequency partition is determined by the BS and is changed infrequently.

The frequency partition boundary is aligned with physical resource units (PRU). In 802.16m, a PRU has 18 adjacent subcarriers in consecutive symbols in a single sub-frame. The frequency partitions are indexed from the lowest Logical Resource Unit (LRU) index to the highest LRU index. It starts from reuse-1 partition if one exists and is then followed by the three reuse-3 partitions. They are numbered as frequency partition 0 (FP0), frequency partition (FP1), frequency partition (FP2), and frequency partition (FP3) respectively.

The additional signaling required by AFR creates additional interference in the system and requires additional radio and processing resources to transmit and process. Overall system performance is improved by reducing this overhead without harming the performance of AFR.

An 802.16m radio environment without AFR has a resource/power allocation pattern of three neighbor sectors in the same cell. The sectors have 7 reuse sub-bands: 3 reuse-3 partitions, 3 reuse-3/2 partitions and 1 reuse-1 partition. Each partition has different number of sub-carriers and different transmitting powers to one another.

In an AFR system, for the case of high reuse factors, one partition employs high transmission power and the other partitions are restricted. An example is given below to illustrate typical transmission power vectors of 3 neighboring sectors in a network with an AFR configuration of reuse 1 and 3:

Sector 1: $P=[P_{Low}, P_{Low}, P_{High}, 0, 0, 0, P_{Re\,use1}]$
Sector 2: $P=[P_{High}, P_{Low}, P_{Low}, 0, 0, 0, P_{Reuse1}]$
Sector 3: $P=[P_{Low}, P_{High}, P_{Low}, 0, 0, 0, P_{Reuse1}]$ The power loading factor PL can be denoted by $PL=P_{High}/P_{Low}$ (assuming $P_{High}/P_{Low}$).

The frequency partition with transmission power of $P_{High}$ is referred to as the power boosted partition, and the partition with transmission power of $P_{Low}$ is referred to as the power de-boosted partition.

An AFR procedure seeks to find the optimal channel partition for any distribution of users and every power loading factor. The related parameters will be updated iteratively in the simulation to optimize the system performance.

When a system initially boots up, there is no information about the distribution or signal propagation environment of the MSs in an area. A predefined reuse partition and some other initial parameters can be set to allow the MSs to measure the average SINR (Signal to Interference and Noise Ratio) for different reuse partitions. The measurements allow the system to start an AFR adaptation procedure. While SINR is currently specified for 802.16m, a wide range of other parameters such as signal to noise, error rate, interference and other channel quality measures, can be used.

Radio resources with high transmission powers and low interference have higher average SINR. The higher SINR allows for higher data rates and fewer errors. Therefore, users would prefer to use the high power partition. Lower power partitions therefore may not be fully used. On the other hand, the gain of higher transmission power of a high SINR partition can affect other nearby MSs. The increased data rate and reduced error rate comes at the price of constrained transmission power and higher interference for other users in neighboring BSs.

A metric called 'resource' can be used to measure the usage of different resource types in terms of system resources. The measurements are used to balance the number of users for different partitions. In an AFR system, users can be commanded to estimate the different SINRs in every partition and to select a proper partition according to its measurement and the system-wide resource metric information.

Meanwhile, BSs can adapt the resource metric of all the partitions according to the MS feedback about the MS preferences for reuse partitions. These are broadcasted periodically to the MSs that the BS is serving. The resource metric can be considered as weight factors to select a partition.

In one example, the resource metric of a frequency partition of a reuse-1 partition has a fixed value equal to 1. The resource metric of the two corresponding power de-boosted frequency partitions in the reuse 3 frequency region are each encoded as unsigned digital values with a resolution of 8 bits.

The resource metric of any frequency partition FPi (i>0) with power boosting can be inferred from the other resource metrics. As a result, the total number of quantization bits for the resource metric is 16 bits. 16 bits of encoded resource metric resolution provides high precision that allows a sub-optimal resource allocation solution for system performance to be achieved. While the performance of each MS may be sub-optimal, system performance is high and spectrum efficiency is high. On the other hand, a quantized resource metric resolution of 16 bits demands significant signaling resources.

Uniform quantization and segment quantization can be applied to the resource metric resolution to reduce the number of bits that must be transmitted. With appropriate selection of the quantization, there may be little performance loss. As described below, 10 bits of uniform quantization and 8 bits of segment quantization can be used to obtain good system performance.

Properly configured, 8-10 bits can be used for the resource metric quantization which saves significant signaling overhead compared to a conventional 16 bits transmission. At the same time similar spectrum efficiency (SE) performance is achieved.

In one example, $2^L$ quantization levels are used for each resource metric and uniform quantization is used for the resource metric. The resource metric of the frequency partition for the reuse-1 partition has a fixed value which is assigned to be 1.

The resource metric of the two power de-boosted frequency partitions in the reuse 3 frequency region are each encoded as unsigned (neither positive nor negative) digital values with a resolution of $1/256$. The resource metric will be quantized as a fraction between 0 and 1 with 256 (8 bits) possible values.

The resource metric of the i'th frequency partition $FP_i$ (where i>0) with power boosting can be inferred from the resource metric of the two power de-boosted frequency partitions. The resource metric of the two power de-boosted frequency partitions, as mentioned above, are quantized as a fractional number between 0 and 1. Similarly, the resource metric of the power boosted partition can also be quantized and the resource metric of the two power de-boosted partitions can be inferred.

Consider that for example, $2^L$ quantization levels are used. The range of levels can be divided into equal quantization levels all of which are between 0 and 1 [0, 1]. If there are $2^L$ equal quantization intervals, then L bits is required to encode the value. Each quantization interval can then be mapped to represent a value. In this way all of the resource metrics are uniformly quantized to $2^L$ values, and can be encoded to L bits.

In a second example segment quantization is applied to the resource metrics. While in the first example, all of the resource metrics were quantized with the same number of values $2^L$, in the second example, the range of possible resource values are divided into segments and each segment is quantized differently.

First, the BS decides the total range of resource metric values for all of the segments. This can be done using, for example, power loading levels. The power loading values are determined in a cell planning phase as a mechanism to achieve the best tradeoff among capacity and coverage. Once power loading values are determined, each frequency partition has a predetermined power boosting or de-boosting value. This value is broadcasted by the BS to all the MSs in the network entry phase. The MS can use this information for better link adaptation.

This range can be denoted as a range from a to b, [a, b], where a is the lowest actual value and b is the highest. Second, the range of resource metric values is divided into three partitions. These partitions can be: from 0 to a, from a to b, and from b to 1, [0,a], [a,b], [b,1].

Having made the partitions, the number of quantization levels for each partition can be determined. In this example, each partition is divided into some number of uniformly spaced levels. For example, the ranges [0, a] and [b,1] can each be quantized with $2^{(L-2)}$ uniform quantization levels. The range [a,b] can be quantized with $2^{(L-1)}$ uniform quantization levels. While good results have been achieved with these numbers of levels in each range, the particular choice can depend upon the particular application and the needs of the system.

The values above L, L-1 and L-2, are believed to work well because the resource metric values, after they are received, converge to a value between a and b. In order to have better performance in the converged state, the quantization intervals in the partition from a to b, [a,b], can be set smaller than for a uniform quantization as in the first example. Besides, as in the first example, the initial resource metric is set to be 1, the quantization interval in the range from b to 1, [b,1], is set at an intermediate value to insure the convergence of the resource metric. On the other hand, since the resource metric will seldom take any values in the range of 0 to a, [0, a], this partition requires only few levels.

The techniques described above can provide results very similar to the 16 bit AFR signaling with far less data. The spectrum efficiency obtained using 4-10 bits for the uniform quantization of the first example and 8 bits for the segment quantization of the second example is almost the same as for the 16 bits approach. Substantial savings in radio resources can be made using this approach.

As a further benefit, if the power boosted partition's resource metric is encoded as 1 or some other fixed value, then it does not have to be transmitted at all. By encoding the other resource metrics in terms of a fraction of the power boosted resource metric, additional savings are made by reducing the amount of data to transmit.

In a third example, specific values can be selected. First, the resource metric of frequency partition (FP0) (reuse-1 partition) has a fixed value equal to 1. The resource metric for the two power de-boosted frequency partitions in reuse 3 frequency region are defined based on the resource metric for the power boosted partition (FP0). The resource metric of the partition with the lower partition index can be sent first, followed by the resource metric of the second de-boosted partition.

The resource metric of the two power de-boosted frequency partitions can be defined as a fractional number x between 0 and 1. It is encoded as an unsigned integer y from 0 to 15, therefore requiring four bits for each of the two frequencies. The encoding can be assigned as follows:

if $0 \leq x < 0.5$:
  $y = \text{floor}(x/0.125)$
if $0.5 \leq x < 0.8$:
  $y = \text{floor}(x-0.5)*8/0.3+4$
otherwise:
  $y = \text{floor}((x-0.8)/0.05)+12$ The resource metric of the frequency partition FPi (i>0) with power boosting can be calculated as follows: resource metric(i)=3−sum(resource metric of partition with power boosted).

FIG. 1 shows an example of a cellular radio system 10. MS (mobile station) 12, 14 can be mobile or fixed and can take the form of cellular telephones, netbooks, personal computers, media players, appliances, or any of a variety of other wireless connected devices. The MS can also be referred to as a subscriber station, remote station, terminal, or by other terms.

A number of base stations (BS) 16-24 are provided in the system to provide connections for the MS. The BS can take a variety of different forms and may cover large or small areas and transmit powers, depending on the application. While the BSs are shown as being similar in FIG. 1, they may be connected and configured differently from each other as well. In some applications, a network access point or an MS peer may act or function as a BS. In the illustrated example, the first MS is registered with a BS 19 and the second MS is registered with another BS 23. This registration allows each MS to communicate with the BS to support all of the services that the MS and the system support.

Each BS 16-24 is connected via an R6 interface 30 to a gateway (GW) or base station controller. In the case of WiMAX, the base station controllers are referred to as ASN-GW (Access Service Network-Gateway). There are three gateways 25, 26, 27. Each gateway supports several BSs. The gateways may or may not be connected to each other via an R4 interface 28 and are all connected directly or indirectly to a Mobile Telephony Switching Center (MTSC) (not shown). There may be one or more MTSC's in any one system. The MTSC is coupled to a telephony backbone that provides access to other telephony systems, data servers and services and more. In some instances, a BS may be connected directly to the MTSC through the backbone instead of through a gateway.

In the illustrated example, system administration and management can be distributed between the BS, GW, and MTSC in a variety of different ways. For communications, the first MS 12 can communicate with the second MS through the respective connected BS and GW. If both MS were registered at the same BS, the BS may be able to support communications without routing through the GW. Similarly, if the second MS were connected to another system, MTSC or ISP (Internet Service Provider), then the two MS can communicate through the backbone.

FIG. 1 shows one example network, however, the present invention can be applied to a wide range of different network configurations and communications can be routed differently to suit different situations and applications. The diagram of FIG. 1 represents a single Access Service Network (ASN). Each ASN may have several, even hundreds of BS and GWs. A BS is connected to a fixed GW using an R6 interface.

FIG. 1 shows an example of an MS 12 connected to BS 19. It is moving to the right in the diagram toward the next BS 20. The second BS 20 is connected to GW2 26. When the MS moves from the first BS, connected to GW1, to the second BS, connected to GW2, then there will be a handover of the MS from the first BS to the second BS. After the handover, the MS will listen to the resource metrics broadcast by the target base station and then select a frequency partition for use with the target base station. The BS will continue to broadcast resource metrics and the MS may at some point choose to change from one frequency partition to another.

Figure 2:
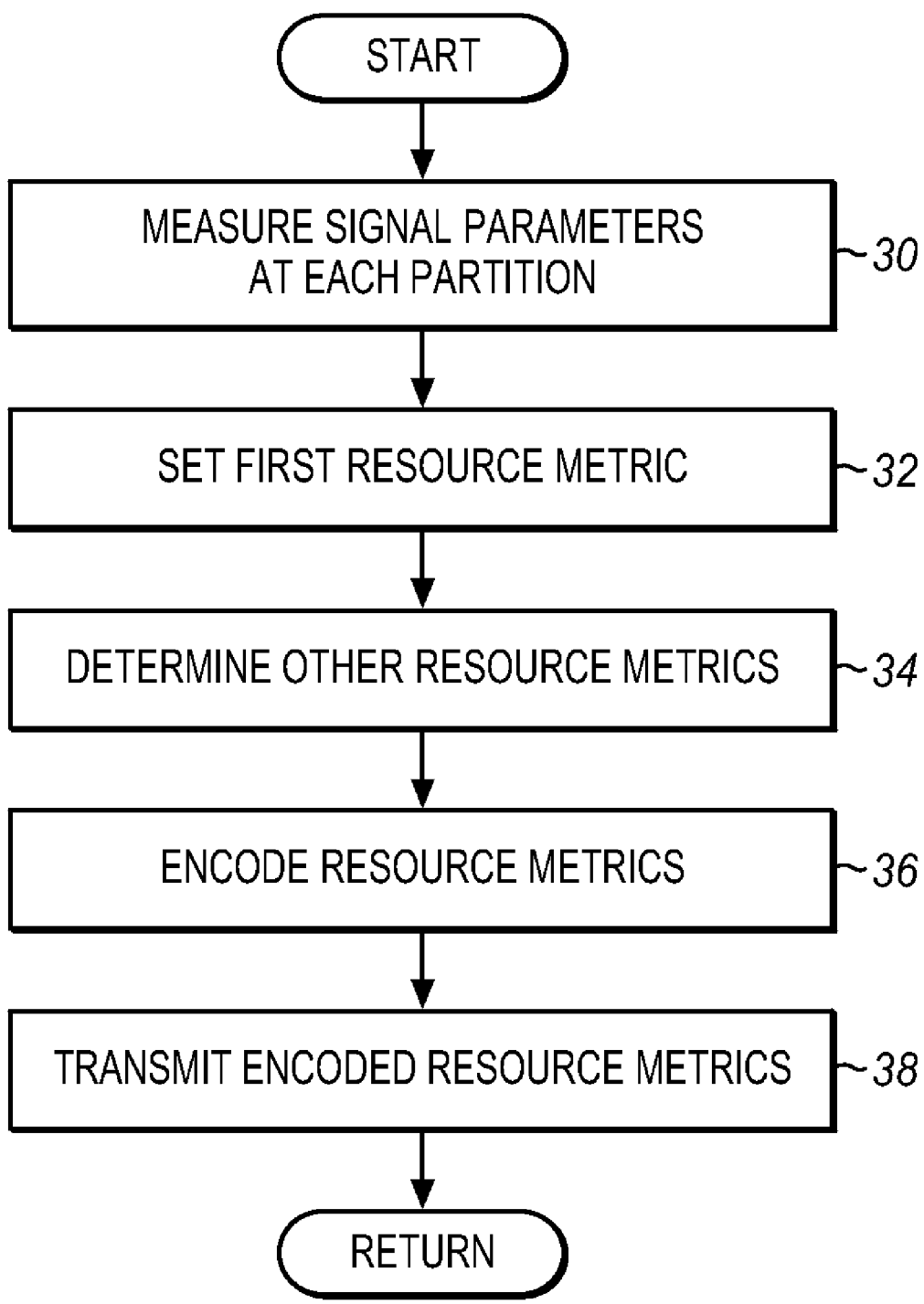
FIG. 2 is a process flow diagram for encoding a resource metric according to an embodiment of the invention.

FIG. 2 shows a process flow diagram for encoding resource metrics according to one embodiment of the present invention.

FIG. 1 shows an example process flow for determining and encoding resource metrics according to an embodiment of the invention. At block 30, a base station measures a signal parameter for a plurality of frequency partitions. The parameters may be transmit power, received power, or various other power measures. The parameters may be any of a variety of signal quality measures, such as SINR, or other ratios of signal, channel, or bits to noise and interference. The parameters may also be error rate measures, such as bit error rate, an error detection code value etc. Alternatively several of these parameters may be combined to generate a representation of the channel quality.

At block 32 a first resource metric for a first frequency partition is set equal to some value. In the examples above, the resource metric is set to 1. However, the resource metric could be set to 16, 100, 256 or any other value, depending on the particular application. The first frequency partition in the examples above is selected as the highest power frequency partition. However, a different partition can be selected.

For simplicity, the first frequency partition can be selected as the partition that has the largest or the smallest amount of the measured parameter or combined parameter measure. This allows the resource metric of the other frequency partitions to be expressed as a fraction or multiple of the first frequency partition. However, as an alternative, the first frequency partition can be selected based on a numerical, time, or frequency and the other resource metrics can be expressed as both fractions or multiples or based on distance from the first partition.

At block 34, the base station determines resource metrics for other frequency partitions. In 802.16m, there are currently four frequency partitions. However, the present invention can be adapted for more or less partitions depending upon the particular application. The resource metrics are values that reflect the measured parameter for the other frequency partitions. However, they are not expressed in terms of a raw value or measurement but instead based on the value for the first resource metric. In other words, the base station compares the measured signal parameter for the second and third frequency partitions to the measured signal parameter for the first partition and derives the resource metrics based on that comparison.

In the examples above, the resource metrics are determined as fractions. So for example, if the first frequency partition has a power level of 6 dB and the second frequency partition has a power level of 3 dB, then 6 dB is set as 1. The resource metric for the second frequency partition is then ½. While 3 dB is not half of 6 dB, such a convention may be useful for some implementations. If the first resource metric is set to 16, then the second resource metric could be set to 8. Different approaches can be used to determine the second and third resource metrics depending on the radio characteristics of the particular system.

At block 36, the resource metrics are encoded. As explained above, quantization levels are applied to the determined resource metrics and these are used to determine a short code or bit sequence to represent the values. In the uniform quantization system mentioned above in which L is 8, there are 256 quantization levels each corresponding to $1/256$ of the values between 0 and 1. In the example above in which the second resource metric is ½, this would correspond to $128/256$ and be encoded as the binary value 00001111. For segmented quantization, first the range of the resource metric is determined, then the value of the resource metric is encoded using the quantization levels established for that range.

At block 38, the encoded resource metrics are transmitted to a remote wireless station. In 802.16m, this is done by the base station using a portion of the broadcast channel. In other wireless protocols, the resource metrics can be transmitted on other channels or additional channels. In addition, these operations can also be performed by a mobile station or subscriber unit and the encoded values sent to the base stations or to peer terminals.

Figure 3:
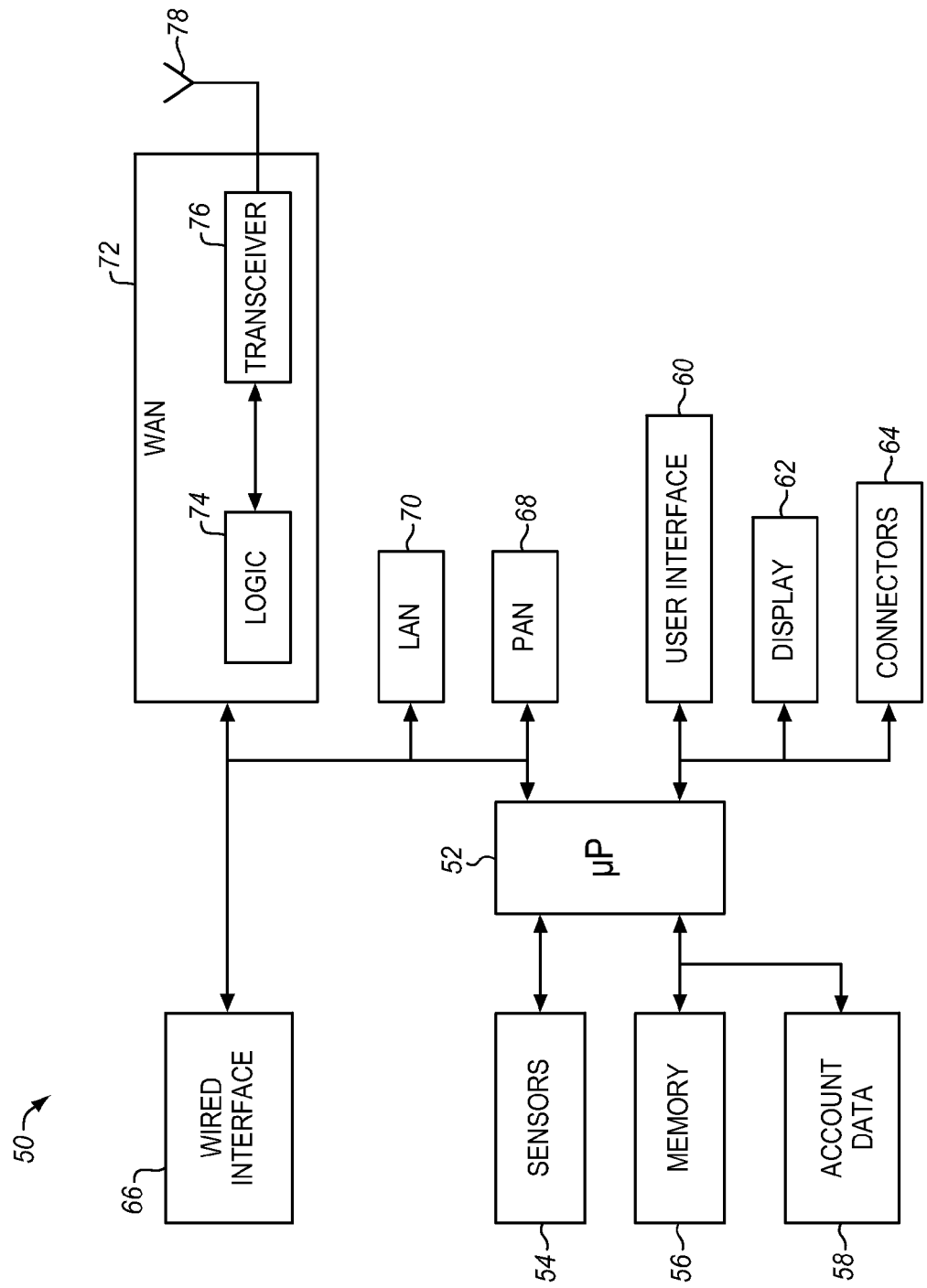
FIG. 3 is a block diagram of a radio terminal or station according to an embodiment of the invention.

FIG. 3 shows an example of a hardware configuration that can be used for both a base station and a mobile station to implement the communications described above. In FIG. 3, the station 50 is driven by a processor 52. This can be a small, low power processor in the case of a MS or a high power, high-speed processor in the case of a BS.

The processor has a memory bus that is coupled to a memory 56, such as magnetic, optical, or solid state memory or some combination thereof. The memory contains programming instructions and user data that can be sent and received between stations. Account data 58 can also be connected to the bus. For the MS, this can include a SIM (Subscriber Identity Module) and other stored personal parameters. For the BS this can include account authorization databases or connections to such databases.

A suite of sensors 54, such as positioning sensors, battery or power sensors, cameras and microphones, and transceiver signal sensors are coupled to the processor to provide additional data to the processor.

A user interface bus, such as USB (Universal Serial Bus) or another type of user interface connection connects the processor to a user interface 60, such as a keyboard, touch screen, mouse, trackball, or other interface, a display 62, and other connectors 64 to allow other devices to be connected. The particular user interface can be adapted to suit the particular application. A user can enter or attach text or other short messages through the user interface and can use the interface for system maintenance and control. For a MS, the user can, through the interface, make recordings with the microphone and camera and attach them to short messages that are commanded to be sent to a specific user or group of users using the keyboard or touch screen.

The processor 52 is coupled to another communications bus for communications with other devices. A wired interface 66 allows a BS to communicate with other BS's, gateways, base station controllers, operations and maintenance centers, etc. For the BS, the wired interface can allow for network connections and for a portable device, it may allow the device to be coupled to a personal computer for updates and maintenance. The communications bus also provides for wired or wireless connections to a personal area network (PAN) 68, such as Bluetooth, a local area network (LAN) 70 such as Wi-Fi, and a wide area network 72, or metropolitan area network such as 802.16m. More or fewer network adapters may be provided, depending on the application. Some network functions may be consolidated or separated, and a variety of different communications protocols and configurations may be used.

The wide area network (WAN) adapter 72 includes logic 74 to generate, assemble, encode, encrypt, and queue packets to be sent through the WAN. The logic is coupled to a transceiver 76 to modulate, encode, and amplify the packets from the logic for transmission through an antenna 78 over the WAN. The antenna may have one or more elements, depending on performance, cost and design considerations. The same transmit chain can also function as a receive chain or a separate receive chain (not shown) can be used. The receive chain would perform the reciprocal functions of receiving demodulating, amplifying, parsing, decoding, etc. to obtain data to send back to the processor over the communications bus.

In the case of receiving an encoded resource metrics, the received values are sent to the processor and are then used to select a frequency partition. This selection is used in registration, call maintenance, etc. In the case of sending encoded resource metrics, the parameters for each frequency partition are measured using the antennas and then sent to the processor to be evaluated and encoded. The results are then sent through the transceiver. A separate antenna system may be provided for measuring the signal parameters in order to improve the quality of the measurements.

The configuration of FIG. 3 can also be applied to a mobile station in the form of a portable or desktop computer equipped with a wireless adapter. The WAN adapter 72 can be provided as a separate component on USB, a PCI (Peripheral Component Interconnect) bus, or any other suitable bus, or it can be provided as an internal system component.

A lesser or more equipped communications station 50 than the example described above may be desirable for certain implementations. Therefore, the configuration of the system will vary from implementation to implementation depending upon numerous factors, such as price constraints, performance requirements, technological improvements, and/or other circumstances.

Embodiments of the present invention have been described in the context of WiMAX and particular messages within that communications protocol and standard, however, the invention is not so limited. Embodiments of the present invention can be applied to other communications protocols and other types of control messages within WiMAX and other protocols in order to allow mobile or subscriber stations to evaluate and select wireless resources.

Similarly, embodiments of the invention have been described using terminology consistent with WiMAX architectures and protocols. However, the present description can also be understood as applicable to similar and equivalent devices and signals that use different names. For example, the term mobile station as used herein may instead, or in addition, be applied to an advanced mobile station, a subscriber station, a user station, a remote device, a subscriber unit, a mobile unit or similar device. The term base station may be applied to a base transceiver station, access point, wireless network node, relay or repeater station or similar device. The term gateway may be applied to a base station controller, switching center, wireless router, and similar devices. In addition, the description herein as applied to resource metrics of frequency partitions, can also be applied to other parameters of other radio resources, such as channels, sub-channels, carriers, subcarriers, etc. The present invention can be adapted to work with variations and modifications of these protocols as well as other protocols that are used in other types of systems. In for example, 3GPP LTE, the approach described above can be used with the ICIC (Inter-Cell Interference Coordination) architecture.

While the steps described herein can be performed under the control of a programmed processor, such as the processor 52, in alternative embodiments, the steps can be fully or partially implemented by any programmable or hard coded logic, such as Field Programmable Gate Arrays (FPGAs), TTL logic, or Application Specific Integrated Circuits (ASICs), for example. Additionally, the method of the present invention can be performed by any combination of programmed general-purpose computer components or custom hardware components. Therefore, nothing disclosed herein should be construed as limiting the present invention to a particular embodiment wherein the recited steps are performed by a specific combination of hardware components.

The present invention can be provided as a computer program product that can include a machine-readable medium having instructions stored thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
   measuring a signal parameter for a plurality of frequency partitions;
   setting a first resource metric for a first frequency partition equal to a first value;
   determining a second and a third resource metric for a second and third frequency partition, respectively, based on comparing the measured signal parameter for the second and third frequency partitions to the measured signal parameter for the first partition;
   encoding the second and the third resource metric for the second and third partitions using quantization levels by dividing the resource metrics for the second and third partitions into segments, each segment having a range of allowed values for the second and third resource metrics, the values being encoded differently for different segments; and
   transmitting the encoded resource metrics to a remote wireless station.

2. The method of claim 1, wherein measuring the signal parameter comprises measuring a signal to noise ratio.

3. The method of claim 1, wherein measuring the signal parameter comprises measuring a transmit power.

4. The method of claim 1, wherein determining the second and the third resource metric comprises defining the second and third resource metric as a fraction of the first resource metric.

5. The method of claim 1, wherein the first value is 1 and wherein determining the second and the third resource metric comprises defining the second and third resource metric as a fraction with a value between zero and one.

6. The method of claim 1, wherein encoding the second and third resource metric comprises quantizing the resource metrics as corresponding to one of a fixed number of the quantization levels, the number of fixed quantization levels being different for different segments.

7. The method of claim 1, wherein encoding the second and third resource metric comprises quantizing the resource metrics as corresponding to one of a fixed number of the quantization levels, wherein the quantization levels are uniform in size.

8. The method of claim 1, wherein the quantization levels are smaller for one segment of the second partition and larger for another segment of the second partition.

9. The method of claim 1, wherein the range of possible resource metric values are divided into three segments, a second segment having fewer quantization levels than a first segment and a third segment having fewer quantization levels than the first segment.

10. The method of claim 9, wherein the first segment corresponds to a high range of values and the third segment corresponds to a low range of values.

11. The method of claim 1, wherein the range of possible metric values are divided into three segments, wherein a second segment has $2^{(L-1)}$ quantization levels, a first segment has $2^{(L-2)}$ quantization levels, and a third segment also has $2^{(L-2)}$ quantization levels.

12. The method of claim 1, wherein transmitting the encoded resource metrics comprises transmitting encoded values for the second and third resource metrics in terms of the first resource metric without transmitting the first resource metric.

13. An apparatus comprising:
   a transceiver to receive radio data signals and to measure a radio parameter of the radio data signals; and
   a processor to determine second and third resource metrics for the measured parameters by setting a first resource metric for a first data signal of a first frequency partition to a first value and then determining second and third resource metrics for other data signals of second and third frequency partitions based on comparing the measured parameter for the first data signal to the measured parameters for the other data signals,
   the processor to encode the determined resource metrics for transmission using quantization levels for the second and third partitions by dividing the resource metrics for the second and third partitions into segments, each segment having a range of allowed values for the second and third resource metrics, the values being encoded differently for different segments,
   the transceiver to transmit the encoded resource metrics.

14. The apparatus of claim 13, wherein the processor is to encode by quantizing the resource metrics as corresponding to one of a fixed number of the quantization levels.

15. The apparatus of claim 13, wherein the range of possible resource metric values for the second partition are divided into three segments, a second segment having more quantization levels than a first segment and a third segment.

16. The apparatus of claim 13, wherein the transceiver is a base station transceiver and wherein the transceiver is to transmit the encoded resource metrics as part of a broadcast channel transmission.

* * * * *